United States Patent [19]

Reeves

[11] 4,447,866

[45] May 8, 1984

[54] SUPPLEMENT TO CROSS REGULATION IN DC TO DC CONVERTERS

[75] Inventor: Charles R. Reeves, San Jose, Calif.

[73] Assignee: Conver Corporation, Cupertino, Calif.

[21] Appl. No.: 311,437

[22] Filed: Oct. 14, 1981

Related U.S. Application Data

[63] Continuation of Ser. No. 048,498, Jun. 14, 1979, abandoned.

[51] Int. Cl.³ .......................................... H02M 3/335
[52] U.S. Cl. ....................................... 363/21; 363/82; 363/93; 323/266
[58] Field of Search .................................. 363/18–21, 363/75, 82, 86, 90–91, 93, 101; 323/249, 251, 254, 266, 267, 282, 290

[56] References Cited

U.S. PATENT DOCUMENTS

| | | | |
|---|---|---|---|
| 2,903,639 | 8/1959 | Meszaros | 363/91 |
| 3,087,107 | 4/1963 | Hunter et al. | 363/82 |
| 3,200,328 | 8/1965 | Green | 363/91 X |
| 3,210,637 | 10/1965 | Gams | 363/91 |
| 3,569,818 | 3/1971 | Dahlinger | 307/33 X |
| 4,004,209 | 1/1977 | Lawson, Jr. | 363/25 X |
| 4,058,758 | 11/1977 | Peterson | 363/25 X |
| 4,122,514 | 10/1978 | Amin | 363/21 |
| 4,217,632 | 8/1980 | Bardos et al. | 323/267 X |

*Primary Examiner*—Peter S. Wong

[57] ABSTRACT

A variable inductance is placed in series with the diode rectifiers of the auxiliary outputs of a dc-to-dc converter. Increasing or decreasing the value of this inductance affects only the permeance of leakage flux paths which link the transformer winding peculiar to that auxiliary output. Such changes in the permeance of the leakage flux involve only the self-inductance of the transformer winding associated with that auxiliary output. When the permeance of the variable inductor is increased, the voltage to which the auxiliary output can rise increases as well. Conversely the steady state value to which the output voltage can rise may be reduced by reducing the permeance of the variable inductor. An error amplifier across the terminals of the auxiliary output detects and deviation in the output voltage from a predetermined, selected level. The error detector causes the value of the variable inductance to change so as to compensate for deviations in the output voltage from the predetermined selected levels.

6 Claims, 2 Drawing Figures

SUPPLEMENT TO CROSS REGULATION IN DC TO DC CONVERTERS

This application is a continuation of application Ser. No. 048,498, filed June 14, 1979, now abandoned.

BACKGROUND

1. Field of the Invention

This invention relates to the field of switched regulated power supplies often referred to as voltage-step-up/current-step-up dc-to-dc converters.

More particularly, this invention relates to improved regulation of the output voltage of such switched regulated power supplies.

Even more specifically, this invention relates to the elimination of the adverse effects of leakage flux associated with the energy-storage transformer in a dc-to-dc converter.

2. Prior Art

A familiar use of switched power supplies was in the early vacuum tube which operated automobile radios. The audible hum noted when the radio was first switched on was that of a vibrating switch which "chopped" the dc voltage applied to the primary of a transformer. This on-and-off again, dc excitation of the primary gave rise to an ac voltage in the secondary of the transformer. This secondary ac was rectified and applied as dc operating voltages to the various vacuum tube circuits of the radio.

The principle of chopping the dc primary input to a transformer and rectifying the ac componant of the secondary remains valid today. Transistor switches and solid state diodes have generally replaced the mechanical choppers and the rectifiers of the early auto radio. Modern day converters may generally be found in one of three generally used configurations well known to those skilled in the art. These are: the flyback converter, the forward converter, and the push-pull converter.

Frequently dc-to-dc converters have multiple outputs. One of these is denoted the main output and the others as auxiliary outputs. A controller is generally provided to regulate the output voltage of the main output. Because of the mutual inductance existing among the windings of a transformer, the effect of regulation of the main output is to also regulate, to some extent, the auxiliary outputs as well. This regulatory effect on the auxiliary outputs is denoted as "cross-regulation". The effectiveness of cross regulation is degraded by inherent characteristics of the circuitry such as resistance drops in the transformer windings, forward voltage drops across diode rectifiers, and leakage inductance of the transformer.

Leakage inductance results from the fact that all lines of flux within the transformer do not cut across every winding of the transformer. Leakage inductance leads to a tendency, in cross-regulated auxiliary outputs, for the auxiliary output voltage to rise significantly above the value to which it would be ideally regulated under light load conditions. So too, there is also a noted tendency for the auxiliary output to sag below its ideally cross regulated output under heavy load conditions. To overcome these adverse effects, linear regulators using pass transistors are often used to regulate the auxiliary outputs. Such linear regulators do not provide an efficiency-effective result since such pass transistors are inherently dissipative.

It is therefore an object of the invention to provide an essentially non-dissipative means of regulating auxiliary outputs of dc-dc converters.

It is a further object of the invention to provide supplementary regulation of auxiliary outputs of dc-dc converters so as to preserve the isolation existing among outputs of said converter.

It is a even more specific objective of the invention to provide a means for regulation of auxiliary outputs of such converters which means permits the construction of the transformer to be simplified.

SUMMARY OF THE INVENTION

A variable inductance is placed in series with the diode rectifiers of the auxiliary outputs of a dc-to-dc converter. Increasing or decreasing the value of this inductance affects only the permeance of leakage flux paths which link the transformer winding peculiar to that auxiliary output. Such changes in the permeance of the leakage flux involve only the self-inductance of the transformer winding associated with that auxiliary output. When the permeance of the variable inductor is increased the voltage to which the auxiliary output can rise increases as well. Conversely the steady state value to which the output voltage can rise may be reduced by reducing the permeance of the variable inductor. An error amplifier across the terminals of the auxiliary output detects any deviation in the output voltage from a predetermined, selected level. The error detector causes the value of the variable inductance to change so as to compensate for deviations in the output voltage from the predetermined selected levels.

Since the variable inductance appears as part of the leakage inductance of the auxiliary output circuit, the only constraint on the construction of the transformer used in the dc-to-dc converter is that the leakage inductance of the main channel be minimized. This is relatively easy to accomplish in converters in which the teachings herein are followed since the ease of control of the variable inductance obviates the necessity for minimizing the leakage inductance of the other windings of the transformer.

The invention may be utilized in single-output, dc-dc converters which in order to meet safety standards are required to provide isolation between the primary input circuit and the secondary output circuit. To meet such standards, it would be necessary to isolate the feedback control circuitry and this is usually expensive, often unreliable, and reduces performance. The use of the variable inductance and error detector, as set forth above, effectively eliminates the need for a feedback controller in a single-output, dc-to-dc converter and enables the designer to meet safety standards requiring isolation of primary and secondary circuits relatively inexpensively, quite reliably and in an essentially non-dissipative manner.

DETAILED DESCRIPTION OF THE INVENTION

Figure 1:
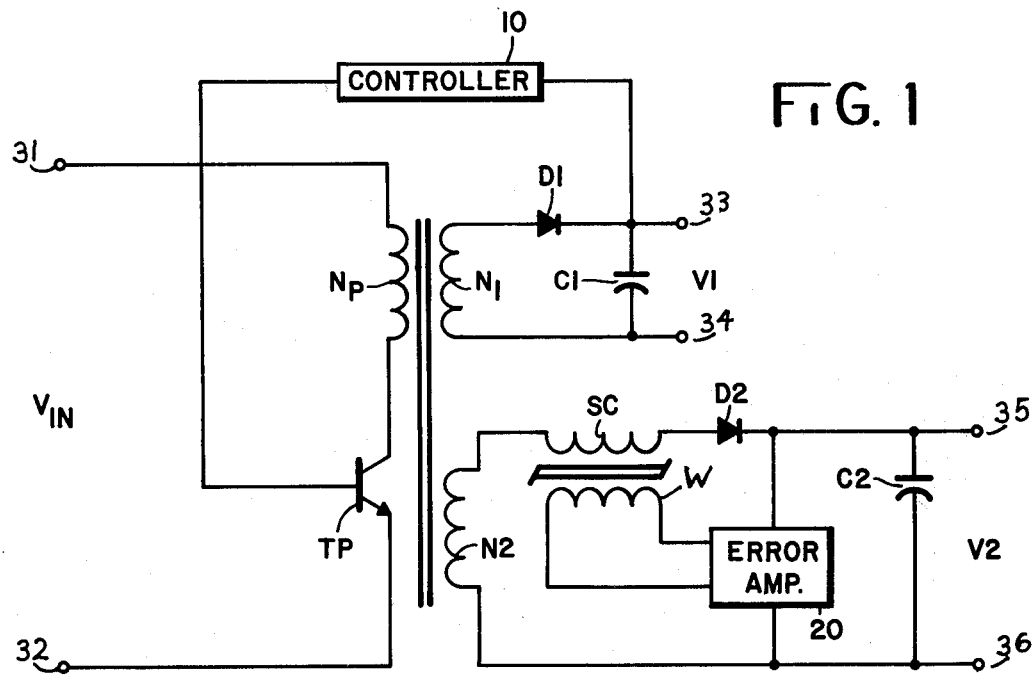
FIG. 1 illustrates the circuit of what is conventionally known as fly-back converter having a feedback controller to regulate the output of the main channel, and a variable inductance and error amplifier in the auxiliary circuit to regulate the auxiliary output.

Switched dc-dc converters are often utilized where several regulated and isolated dc output voltages are required. The requirements on regulation, if not too constrained, will often permit the use of an energy-storage transformer having multiple secondary windings. The illustration of FIG. 1 is generally the same as that of a prior art, dc-dc converter having two output voltages, V1 and V2. In the prior art, both saturable core inductance SC and error amplifier 20 would not have been present. It is the inclusion of saturable core reactor SC and error amplifier 20 which represents the improvement taught herein. The operation of the dc-dc converter of FIG. 1 in accordance with the prior art teachings will be reviewed.

A dc voltage V-in is impressed across terminals 31 and 32 of the series combination of energy-storage transformer primary Np and switching transistor Tp. Controller 10 determines the duty-cycle of switch transistor Tp. That is, controller 10 establishes the duration of the on and off periods of conduction of switch transistor Tp. The duty cycle, in turn, will determine the amount of energy stored in transformer primary Np, being limited only by the ultimate saturation of Np if transistor Tp is allowed to conduct for too long a period.

With Tp in conduction, winding Np stores energy in a magnetic field. As the magnetic field expands causing flux lines to cut across transformer secondaries N1 and N2, no current flows in the secondary windings because of the blocking action of diodes D1 and D2 respectively. When controller 10 causes Tp to go out of conduction, that is to turn-off, the magnetic field about winding Np begins to collapse. In accordance with well-known principles, a voltage will now be induced across secondaries N1 and N2 of such polarity that diodes D1 and D2 respectively will be driven into conduction so as to permit capacitors C1 and C2 respectively to be charged. The voltage across capacitor C1 appears as output voltage V1 across terminals 33 and 34. The voltage across capacitor C2 appears as output voltage V2 across terminals 35 and 36.

Output voltage V1 is sensed by controller 10 which regulates voltage V1 to a desired value by controlling the duty cycle of switched transistor Tp. Voltage output V2 will be affected by the regulation of output voltage V1. The regulation of voltage V2 depends upon the magnetic coupling existing between windings N1 and N2. If the voltage drop across diodes D1 and D2 is considered for convenience to be zero, then voltage V2 is related to voltage V1 by the turns ratio of the two secondary windings as follows:

$$V2 = V1\ (N2/N1)$$

The method whereby controlled regulation of output voltage V1 has the effect of controlling an auxiliary output, say voltage V2, is referred to in the art as "cross regulation".

The use of cross regulation can provide significant cost savings in systems using dc-dc converters, since, by having only one converter with multiple outputs, the need for a multiplicity of single output converters is avoided. Where only one controller is utilized on a dc-dc converter with multiple outputs, the multiple outputs are isolated from each other. Although the cross-regulated, dc-dc converter has such advantages, there are also well known problems familiar to those skilled in the art of dc-to-dc conversion. For example, in prior art devices utilizing cross-regulation, there is a tendency for output voltage V2 to rise well above its ideal regulated value when terminals 35 and 36 are lightly loaded. Conversely, when these terminals are heavily loaded, there is a decided tendency in cross regulated converters for output voltage V2 to sag below its ideal value. The major cause of degraded cross-regulation has been recognized as the leakage inductance of the secondary windings which fails to produce perfect magnetic coupling between windings N1 and N2. As already noted, although leakage inductance is the primary culprit in reducing the effectiveness of cross regulation, other factors also enter in, such as imperfect transformer coupling between primary and secondary windings, winding resistance, circuit resistance and voltage drop across the rectifying diodes.

The invention teaches the use of saturable core reactor SC and error amplifier 20 to achieve post-regulation of auxiliary output voltage V2. Output voltage V1 appearing across terminals 33 and 34 is regulated in the conventional manner using control 10. Such cross-regulation of V2, as exists, is supplemented by actively controlling the inductance of saturable core inductor SC. The voltage drop across saturable inductor SC is a function of the current flowing in control winding W. Error amplifier 20 detects changes in the level of output of voltage V2 and causes compensating changes in the current flowing through control winding W, so as to affect the voltage drop across saturable core inductor SC in a manner to maintain output voltage V2 constant. One of several working embodiments, and one which is presently preferred, is illustrated in greater detail in FIG. 2.

Figure 2:
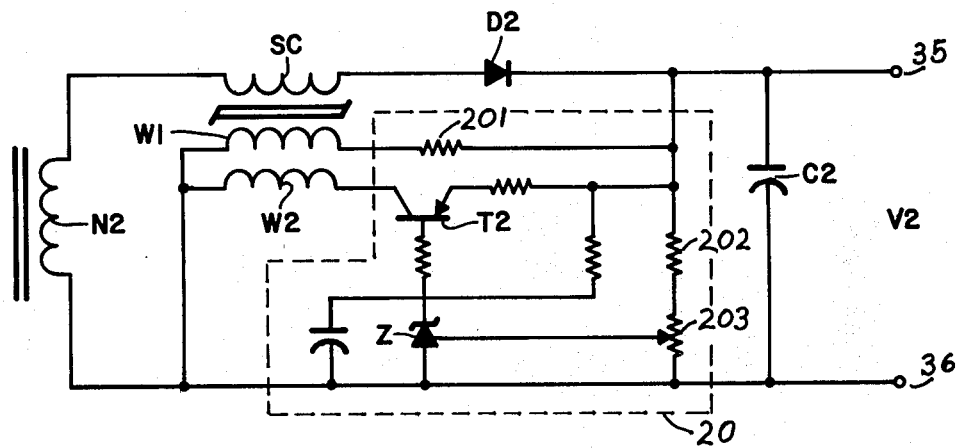
FIG. 2 is a schematic illustrating in greater detail the auxiliary stage of the fly-back converter illustrated in FIG. 1, including an embodiment of an error amplifier which may be utilized in practicing the invention.

FIG. 2 is a detailed schematic of the circuit of secondary winding N2 which presents auxiliary output V2 at terminals 35 and 36.

In FIG. 2 error amplifier 20 is depicted schematically by the components within the dotted enclosure. The greater detail of FIG. 2 shows control winding W to consist of two coils, W1 and W2. As has been noted, there is a tendency in cross-regulated, dc-dc converters for the cross-regulated output V2 to rise significantly above the ideally regulated value when the load across terminals 35 and 36 is very light. It would be highly desirable if the reactance of saturable inductor SC were to increase when output voltage V2 attempts to rise above its ideally regulated value. Similarly, it has been noted that there is a tendency for the cross-regulated output to sag below its ideal value when a heavy load is placed across terminals 35 and 36. In this case, it would be desirable to have the reactance of saturable inductor SC decrease so as to offset the tendency of V2 to drop under increasing load conditions. To these ends, resistor 201 in series with control coil W1 is selected to saturate variable inductance SC when output V2 is presented to its anticipated full load. Saturating inductance SC reduces its reactance to a minimum value and, therefore, the voltage dropped across inductance SC is minimal under heavy load conditions across terminals 35 and 36. It is understood that transformer secondary N2 is designed to present the anticipated and desired voltage V2 across output terminals 35 and 36 when working in a full load with inductor SC fully saturated as determined by the current flowing through control winding W1 and resistor 201.

Resistors 202 and 203 present a voltage divider network across storage capacitor C2 and output terminals 35 and 36. Resistance 203 is a variable resistor having its moveable contact connected to the zener diode Z. The control contact of resistor 203 is set at a voltage level which determines the avalanche point of the programmable zener diode Z. When the load presented to terminals 35 and 36 is reduced, the tendency of cross-regulated output V2 is to rise. This increases the voltage level at the variable contact of resistor 203 and causes zener diode Z to come into conduction. This in turn brings transistor T2 into conduction and current is drawn through control coil W2. Control coils W1 and W2 are so wound, or connected, that a flow of current through coil W2 from transistor T2 will counteract the effect of current flowing through control coil W1. The ultimate effect of current flowing through control coil W2 is to bring saturable inductor SC out of saturation, causing its reactance to increase, and thereby cause an increase voltage drop across inductor SC. This increased voltage drop across inductor SC counteracts the tendency for output voltage V2 to rise under lightly loaded conditions.

In the embodiment of the invention depicted in FIG. 2 the hysteresis characteristic of variable inductor SC is such that there is very little lag in the values of magnetization of its core due to changing magnetic force. That is to say, variable inductor SC moves rapidly from a saturated to a non-saturated state under the control of windings W1 and W2. The rapidity of this change is such that the level of output voltage V2 is determined by the time average change of reactance of inductance SC and therefore, by the time average voltage drop across inductance SC. It should be understood that this does not present a limitation on the use of the invention and that a variable inductor whose hysteresis curve presents a gradual slope as it moves between magnetization states could well be utilized and its control current established so as to select a given inductance reactance to produce a desired output voltage V2 under any expected set of output load conditions to be anticipated.

What I have described is a method of post-regulation of dc-to-dc converters which preserves the isolation among the multiple outputs and which supplements the cross-regulation which results from the control regulation of one of said outputs. The variable inductor SC appears as part of the leakage inductance of the output circuit in which said variable inductor is utilized. Control of this variable inductor SC gives effective control of the permeance of the leakage flux path which links the particular secondary winding on the energy-storage transformer associated with the output utilizing the saturable core inductor. This results in a change only in the self-inductance of that particular winding. None of the mutual inductances of the energy-storage transformer are affected by the utilization of the saturable core inductor SC. In regard to this latter effect, it should be noted that construction of the energy-storage transformer becomes simplified since now the only constraint is that the leakage inductance of the main channel shall be minimized. This is now relatively easy to accomplish since by use of the invention in the multiple auxiliary channels, the leakage inductances of the windings in these auxiliary channels do not have to be so minimized.

The use of a saturable core inductor to establish post-regulation complementing the existing cross-regulation provides an essentially non-dissipative dc regulator for controlling multiple auxiliary outputs of dc-to-dc converters while preserving the isolation of those outputs.

While the invention has been taught in the embodiment of a flyback converter, it may be utilized in any dc-dc converter having multiple outputs from the same energy-storage transformer.

It should be noted that since the invention provides a form of regulation which requires no feedback between the auxiliary output and the primary circuit, the invention may be used to post-regulate the output of a single-output, dc-dc converter which, because of imposed safety standards, requires isolation between primary and secondary. Under prior art teachings which require feedback the need to isolate this feedback has proven expensive, often unreliable, and usually reduces performance. These disadvantages are obviated by practice of the invention set forth herein.

It should be noted further that the use of the saturable core inductor in the secondary winding of the energy-storage transformer provides a simple and efficient method for controlling the actual output level of the voltage impressed across the output terminals of a transformer.

Having set forth my invention in so clear a manner in the text and the drawings appearing herein that one skilled in the art may understand and practice it, I claim:

What is claimed is:

1. A DC to DC flyback converter comprising:
    transformer means including first and second secondary windings and transistor means and diode means for providing a main DC voltage and an auxiliary DC voltage in response to a DC input voltage, said main and auxiliary voltages being directly related to voltages provided by said first and second secondary windings, respectively;
    means coupling said main voltage to said transistor means for regulating said main voltage;
    a saturable core inductor having a saturable inductor winding connected in series with said second secondary winding, said inductor having at least one control winding; and
    error amplifier means, connected to said saturable core inductor, for controlling current through said control winding in response to said auxiliary voltage.

2. A DC to DC flyback converter in accordance with claim 1 wherein said transformer means comprising an energy storage transformer.

3. A DC to DC flyback converter in accordance with claim 1 wherein a feedback controller is connected to said transistor means and is coupled to said one of said first and second secondary windings.

4. A DC to DC flyback converter in accordance with claim 1 wherein a voltage divider is coupled to said control winding, self-controlled switching means connected to said voltage divider at a voltage level for establishing the switching potential of said switching means, and on/off control switching means connected between said self-controlled switching means and one of said three windings.

5. A DC to DC flyback converter in accordance with claim 4 wherein said voltage divider comprises a variable resistor and said self-controlled switching means is connected to said divider at the variable contact of said variable resistor.

6. A DC to DC flyback converter in accordance with claims 4 or 5 wherein said self-controlled switching means comprises a programmable zener diode whose avalanche point is established by the voltage level at its point of connection to said voltage divider.

* * * * *